No. 856,345. PATENTED JUNE 11, 1907.
F. G. JAHN.
MAIL MARKING MACHINE.
APPLICATION FILED FEB. 24, 1905.

9 SHEETS—SHEET 1.

Witnesses:
Inventor
Frederick G. Jahn,
by G. H. Graham
att'y.

No. 856,345. PATENTED JUNE 11, 1907.
F. G. JAHN.
MAIL MARKING MACHINE.
APPLICATION FILED FEB. 24, 1905.

9 SHEETS—SHEET 2.

Witnesses:
Inventor,
Frederick G. Jahn,
by
Att.

No. 856,345. PATENTED JUNE 11, 1907.
F. G. JAHN.
MAIL MARKING MACHINE.
APPLICATION FILED FEB. 24, 1905.
9 SHEETS—SHEET 3.
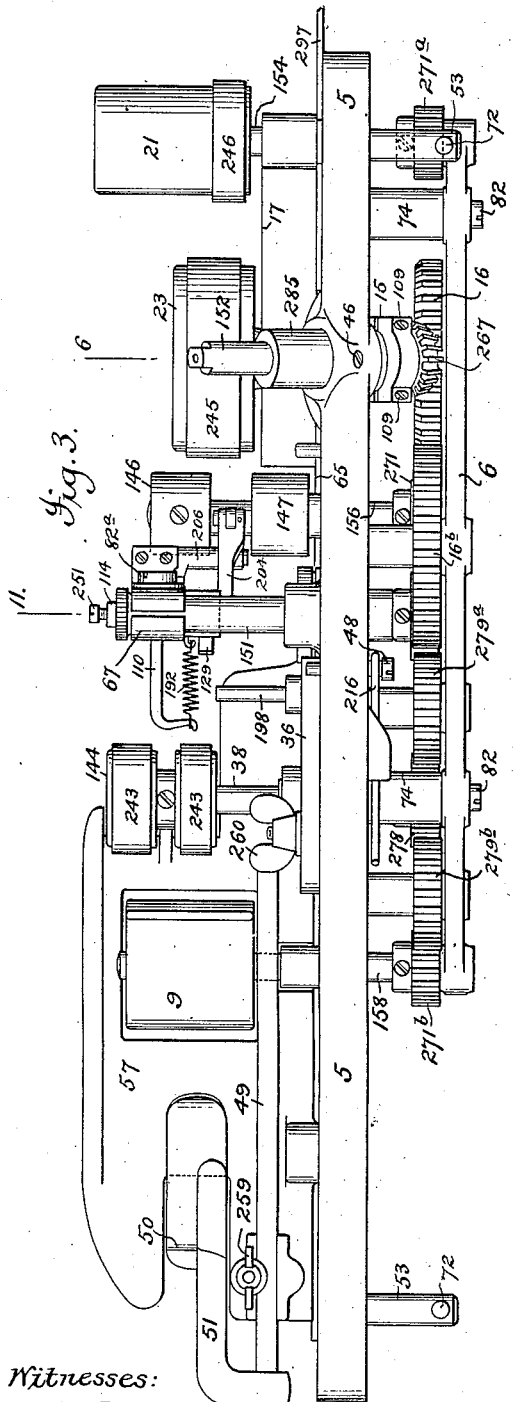
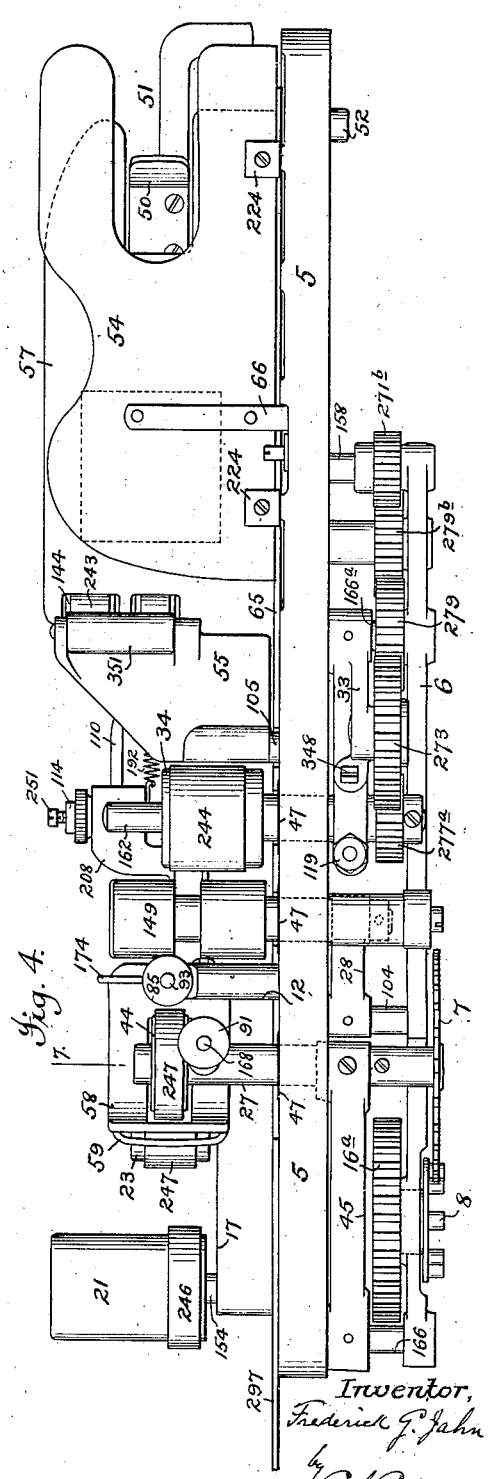
Witnesses:
Inventor,
Frederick G. Jahn

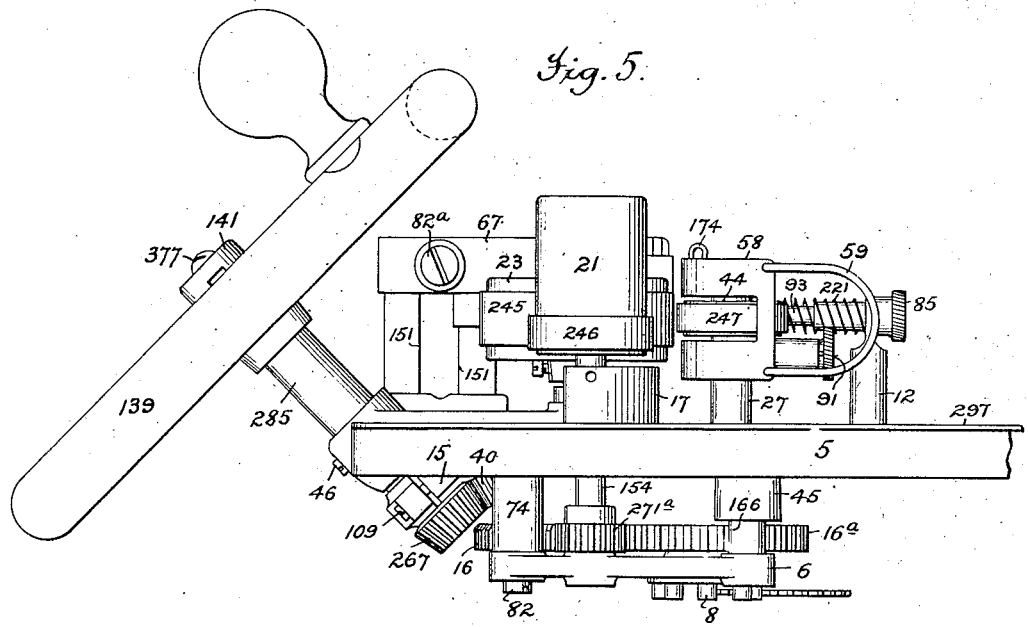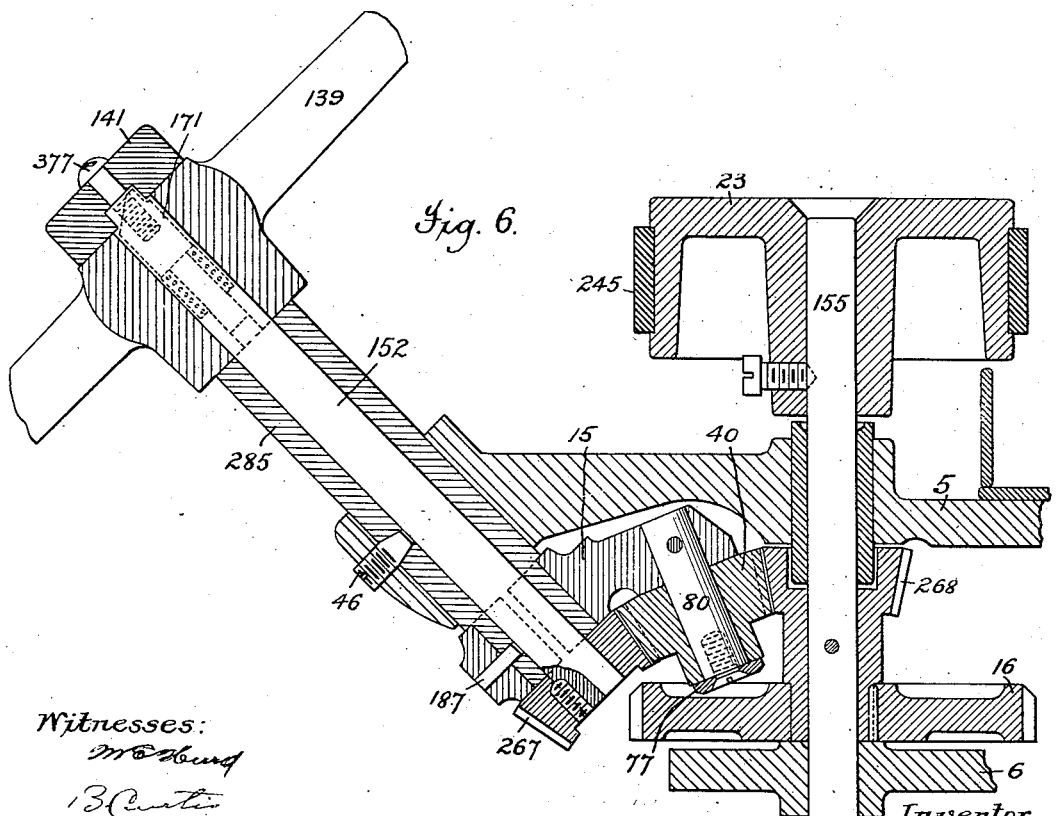

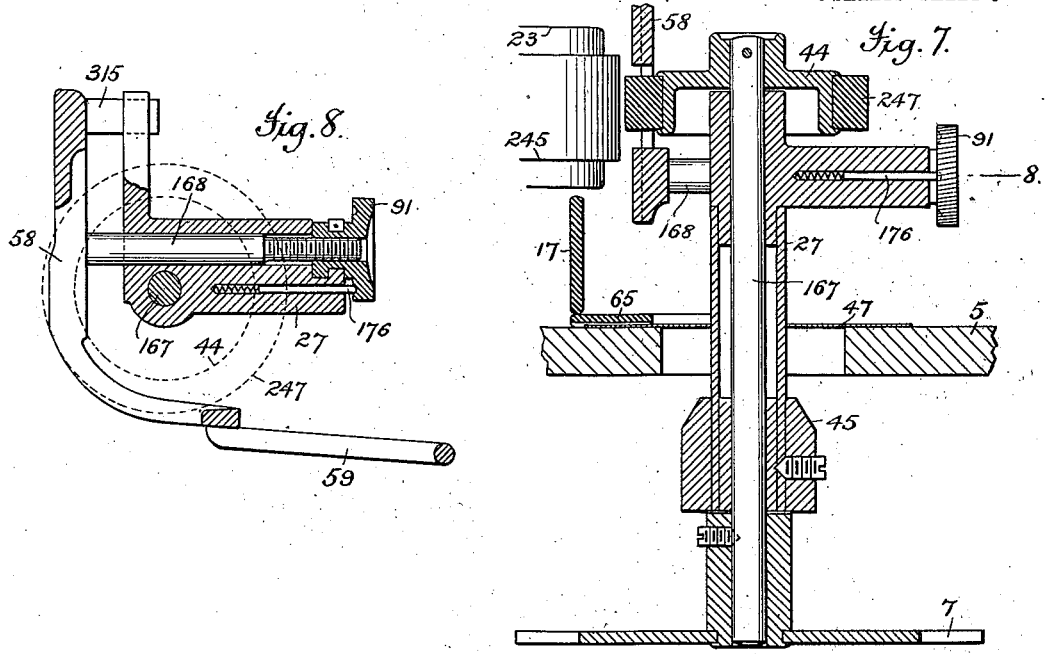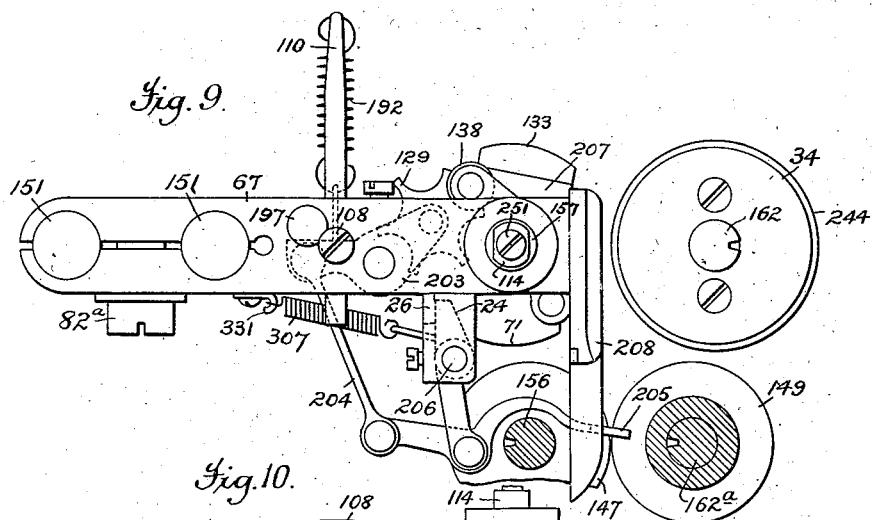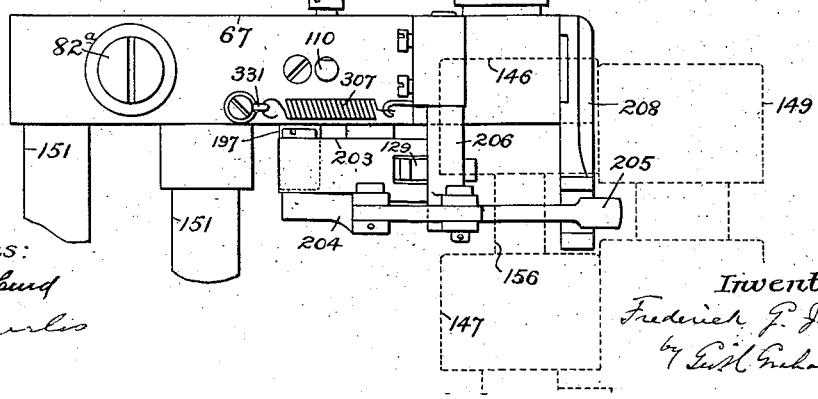

No. 856,345. PATENTED JUNE 11, 1907.
F. G. JAHN.
MAIL MARKING MACHINE.
APPLICATION FILED FEB. 24, 1906.

9 SHEETS—SHEET 6.

Witnesses:

Inventor,
Frederick G. Jahn,
by Geo. M. Graham
atty.

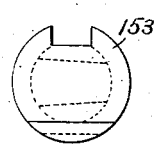
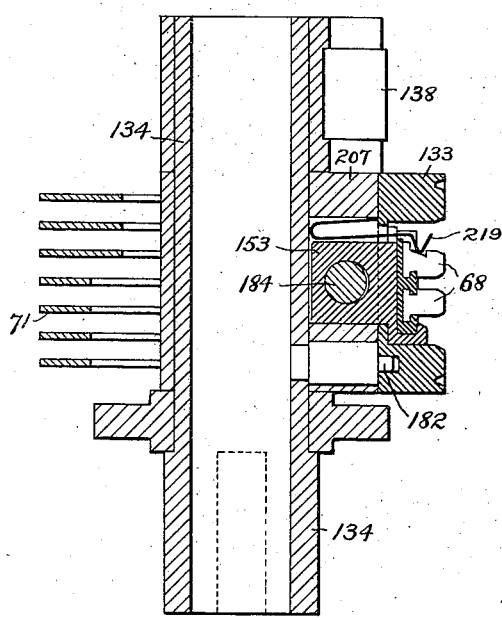
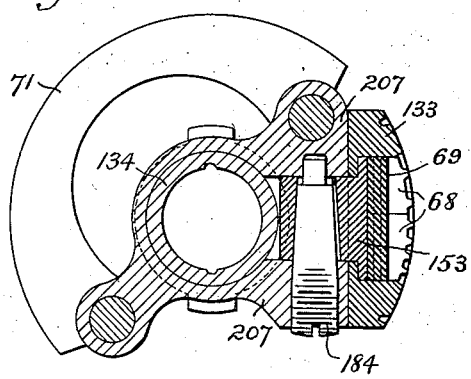
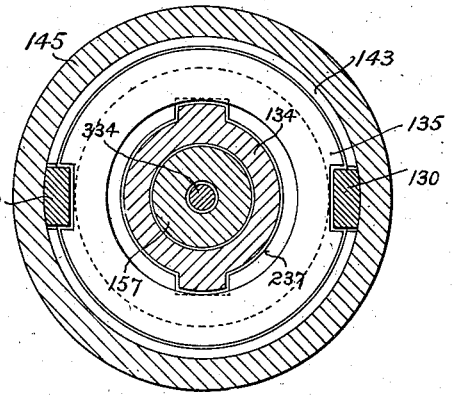

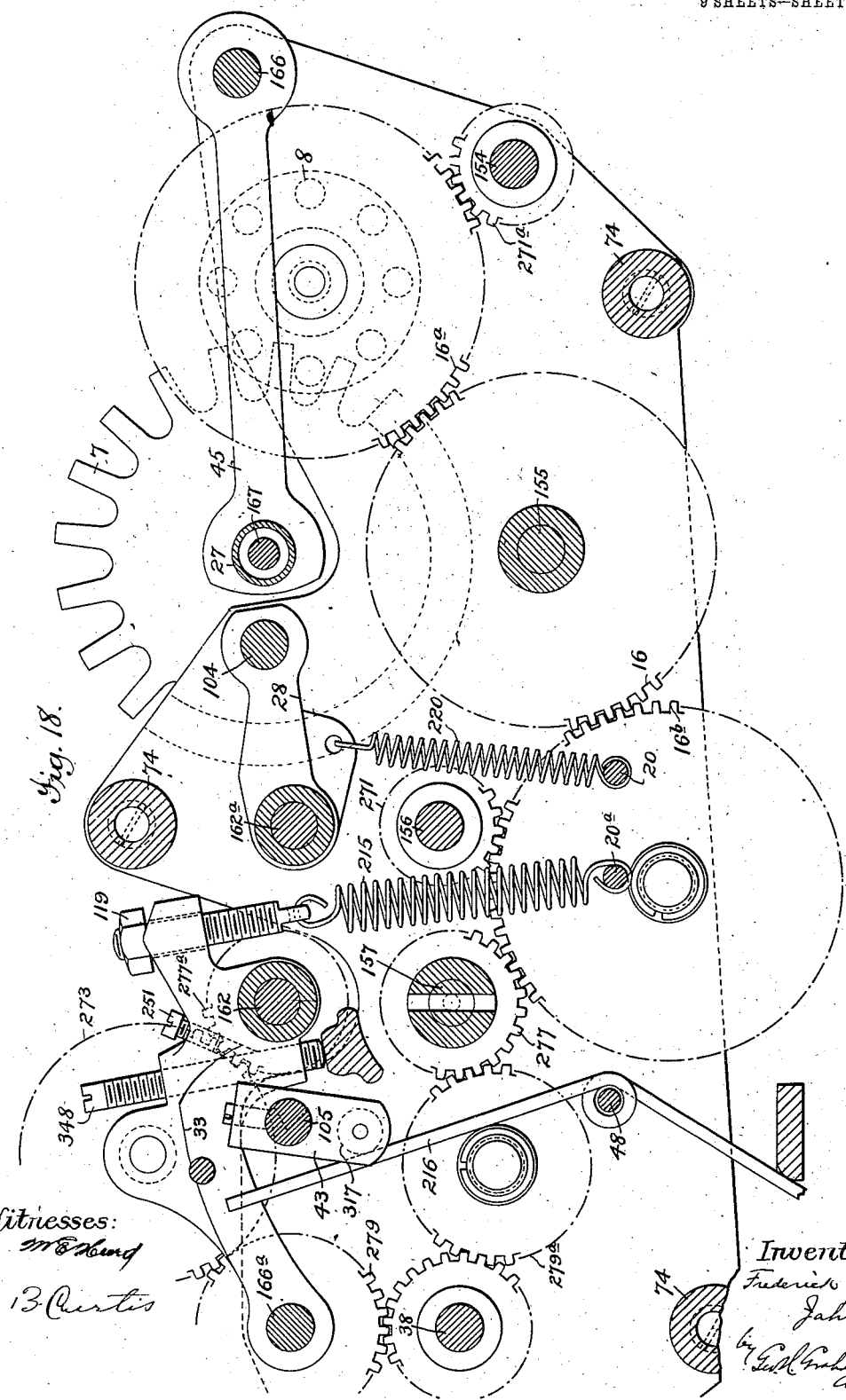

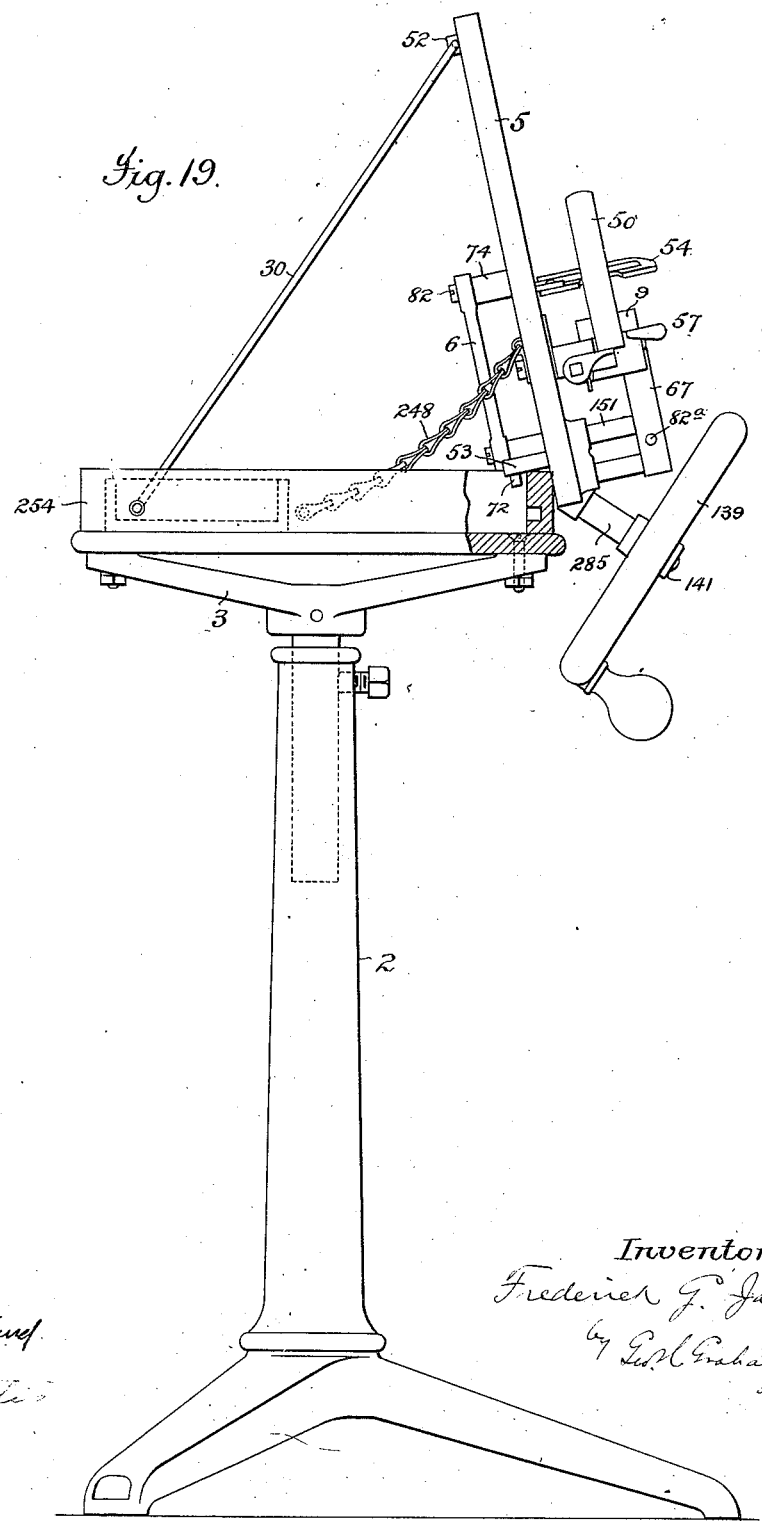

UNITED STATES PATENT OFFICE.

FREDERICK G. JAHN, OF NEW YORK, N. Y., ASSIGNOR TO THE INTERNATIONAL POSTAL SUPPLY COMPANY OF NEW YORK, OF BROOKLYN, NEW YORK, A CORPORATION OF NEW YORK.

MAIL-MARKING MACHINE.

No. 856,345.     Specification of Letters Patent.     Patented June 11, 1907.

Application filed February 24, 1905. Serial No. 247,198.

*To all whom it may concern:*

Be it known that I, FREDERICK G. JAHN, a citizen of the United States, residing at the borough of Brooklyn, city and State of New York, have invented certain new and useful Improvements in Mail-Marking Machines, of which the following is a specification.

The present invention relates generally to printing mechanism and more particularly to that class adapted for use in post offices for marking mail matter; that is to say, to machines employed to cancel the stamps and post mark letters and other mail matter. And it has for its object the cheapening and simplification of the mechanism of such machines the lessening of the needed adjustments and further to adapt them to be hand operated in contradistinction to being driven by other power.

Figure 1:
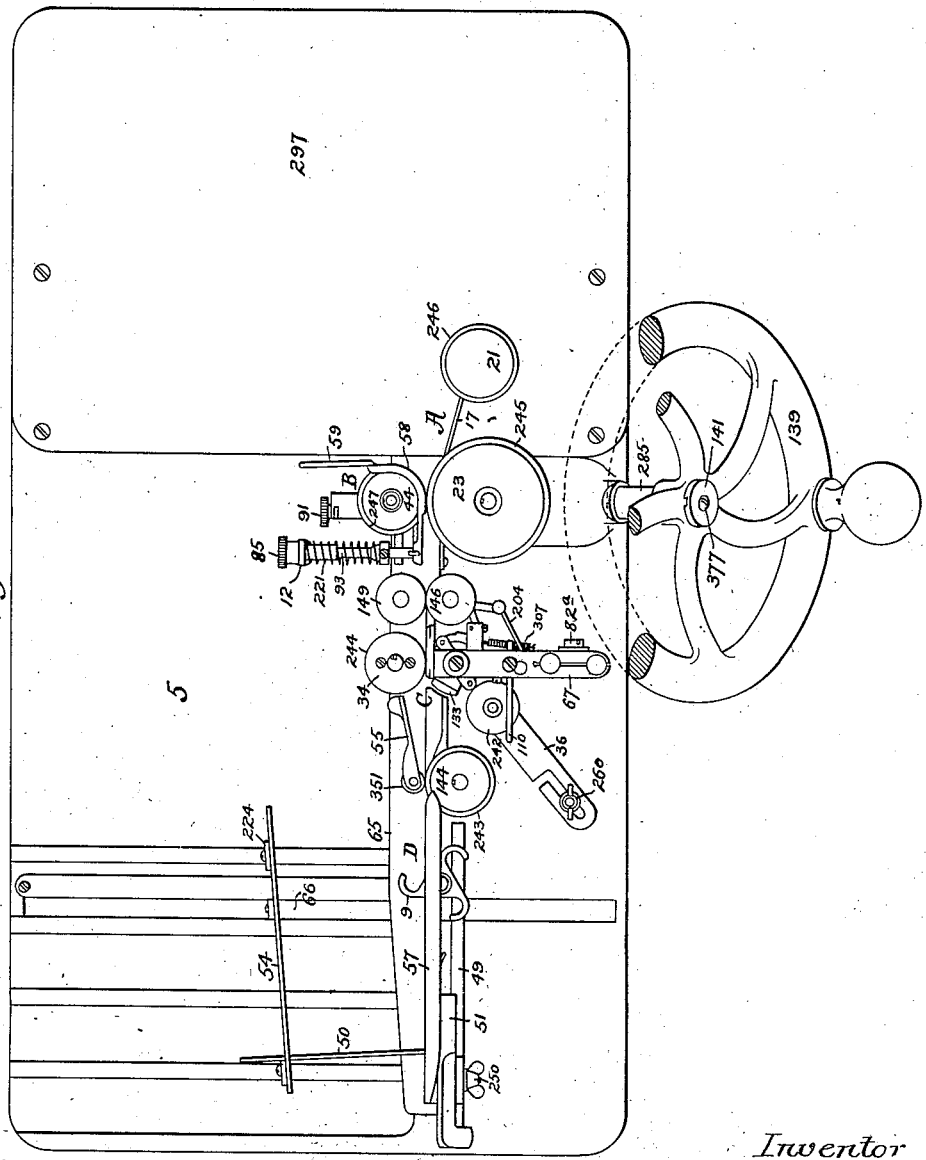
Figure 2:
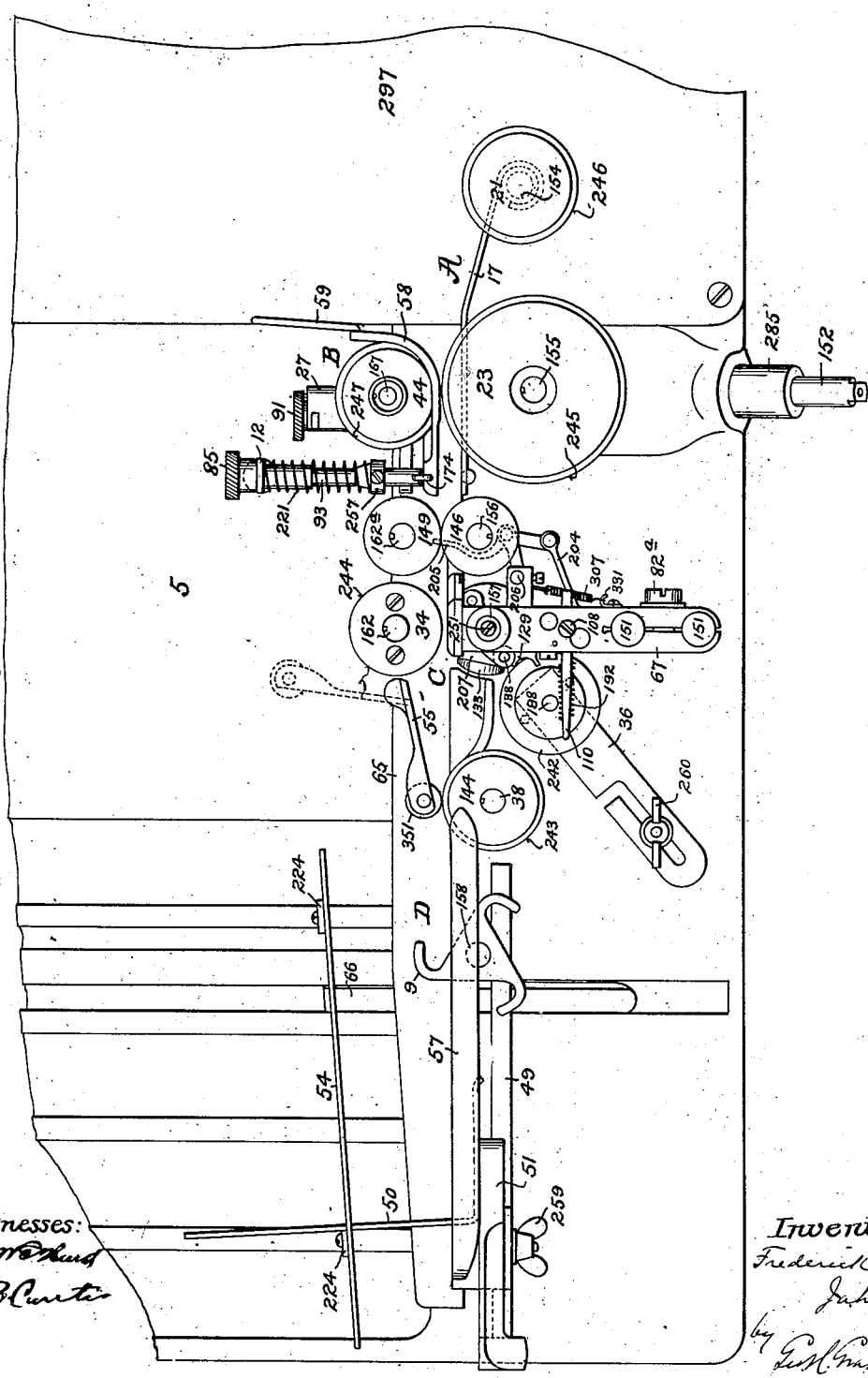
Figure 11:
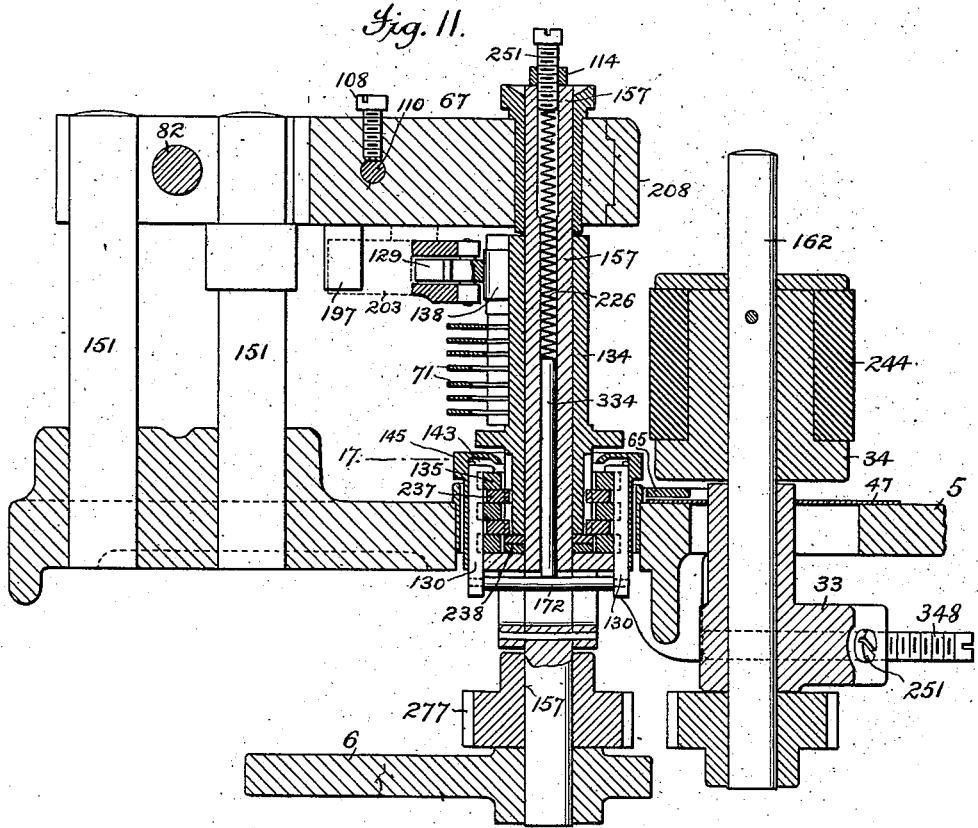
Figure 12:
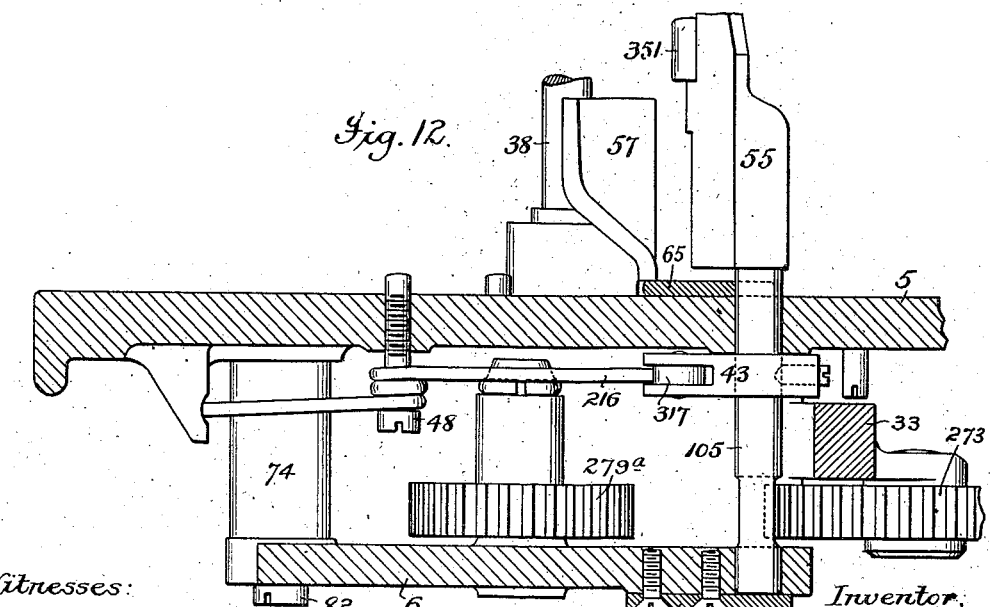

As a better understanding of the invention may be had from a detailed description of a practical embodiment thereof, such description will now be given, reference being made to the accompanying drawings, in which:

Figure 1, is a plan view of the machine; and Fig. 2 is a like view, enlarged, parts of the table being broken away and the operating hand wheel removed to accommodate the view to the sheet. Figs. 3 and 4, are respectively front and rear side elevations. Fig. 5, is an end elevation. Fig. 6, is an enlarged vertical cross section on the line 6 of Fig. 3, showing the driving mechanism and large feed roller with the hand wheel in place but parts thereof broken away. Fig. 7, is a similar section on the line 7, of Fig. 4, showing the separator and adjacent parts. Fig. 8, is a horizontal section on the line 8, of Fig. 7, showing the separator bearing and guard plate. Fig. 9, is an enlarged plan view of the trip and printing mechanism, the trip feed and pressure rollers being in section. Fig. 10, is an elevation of the trip mechanism, the position of the adjacent trip feed and pressure rollers being indicated by dotted lines. Fig. 11, is an enlarged vertical cross section on the line 11 of Fig. 3, showing the printing couple and the clutch for driving one of its members. Fig. 12 is a similar view on the line 12 of Fig. 3, showing particularly the stacker-feed idler roller construction below the machine table, the upper parts being broken away. Fig. 13, is an enlarged vertical section of the die and die hub removed from its spindle. Fig. 14, is a horizontal section of the same on the line 14 of Fig. 13. Fig. 15, is a front elevation of the type box seat. Fig. 16, is a like view of the type box. Fig. 17, is an enlarged horizontal section of the clutch mechanism on the line 17 of Fig. 11. Fig. 18, is an enlarged horizontal section taken immediately below the machine table showing the major portion of the transmitting gearing and contiguous parts. Fig. 19, is an elevation partly in section of the complete machine on its stand, the machine table with the parts it supports being turned upwardly for access to its underlying parts, many of the parts being omitted on account of the smallness of the size of the view.

The improved mechanism is arranged to handle mail matter in bunches or handfuls at a time with the individual pieces thereof previously faced with the postage stamps, as commonly applied, at the lower front face and forward corner thereof all resting on their narrow lower edges and in such position single pieces are automatically fed through the machine, from the right hand side thereof or feeding position to the left hand side or stacking position where they accumulate and are stacked orderly for removal.

The coöperating devices consist of a feed mechanism A with which is associated a separator B, a printing couple C including a trip device for controlling the operation of the printer or die and a stacker D; the parts arranged with their longitudinal axes vertical and to be operated by power applied to a hand wheel 139 conveniently located in an inclined position at the front side of the machine in propinquity to the feed mechanism, the operator using his right hand to supply the bunches of mail matter to the feed mechanism and to hold them in place while the individual pieces are being successively fed and employing his left hand in turning the hand wheel.

The feed mechanism consists of a large feed roller 23 having a feeding surface provided by a rubber ring 245 and has preferably associated with it and preferably located a short distance therefrom a smaller feed roller 21 having near its lower edge a similar rubber ring 246, the upper portion of said roller serving as a guard for matter of undue height.

Directly opposed to the large feed roller 21 is mounted the separator consisting of a narrow roller 44 supporting a rubber feed ring 247 and a guard plate 58 which is slotted to permit the protrusion of the separator roller and its coaction with the feed roller to insure the feed of single pieces of matter in succession through the machine. In advance of the feed and separator rollers is a pair of feed rollers consisting of the trip feed roller 146 and trip pressure roller 149 which coact to carry the individual pieces of matter from the feed mechanism to the printing couple. The printing couple consists of a constantly rotating impression roller 34 having an impression surface formed by a rubber ring 244 and an intermittently rotated printing die 207 that is mounted on a constantly revolving spindle 157 and is controlled in its rotation by the action of a stop 129 which is moved to free the die by the presence of a piece of matter to be marked through the intermediary of a trip finger 205. The parts are so constructed that as soon as the stop is moved to permit the rotation of the die, said stop will immediately return to its stopping position ready to arrest further rotation of the die after the latter has made one rotation and hence it results that no matter how long the piece of mail matter may be the die will operate only once thereon.

The connection between the constantly rotating die spindle and the intermittently rotated die consists of a friction clutch carried by the spindle and composed of a plurality of surface engaging disks 135, 237, the former rotating with the spindle and the latter connected to the die in a manner to be hereinafter more fully described.

After being marked in passing between the members of the printing couple the individual pieces of matter pass thence between a stacker feed roller 144 carrying a pair of rubber feed rings 243 and a stacker idler roller 351 and then longitudinally along at one side of a guard plate 57 toward an end stop 50, the broad faces of the mail matter being struck by the wings of a rotating stacker star wheel 9 which protrudes sufficiently beyond the inner vertical face of the guard plate to move or press the arriving mail matter laterally away from said plate so that space is made for the unobstructed passage of succeeding pieces of mail matter toward the end stop 50. The mail matter is supported in its vertical condition while in the stacker by a laterally moving slide plate 54 which gradually retreats from the guard plate under the pressure of the accumulating matter and the action of the star wheel 9.

The connecting gearing by which the several parts operate in unison is located below the machine table 5 and between it and a gear plate 6 that is secured to the table by posts 74 and engaging screws 82.

The small feed roller 21 is secured to the upper end of a spindle 154 that turns in bearings in the table 5 and gear plate 6 and carries at its lower end a gear 271 of the gear train through which it is rotated. The large feed roller 23, Fig. 6, is secured to the upper end of a spindle 155 supported in bearings in the table and gear plate and has secured to it a sleeve carrying a bevel pinion 268 and one of the gear train wheels 16. The bevel pinion 268 is in mesh through an intermediate bevel pinion 40 with a driving bevel pinion 267 that is fast to one end of a driving spindle 152 supported in an inclined position by a sleeve 285 secured by a set screw 46 to an angularly disposed bearing in the machine table and projecting upwardly above said table with the upper projecting end of the spindle carrying the driving hand wheel 139, by which all the parts of the machine are rotated. By including the driving spindle 152, the hand-wheel is brought over the upper side of the machine so that the weight of the operator's left hand, usually unaccustomed to such work is in a measure supported by the wheel and the needed exertion on the operator in holding his left arm entirely free is practically avoided. So too both of his hands are brought close together and thus work to better advantage while the jerky or irregular motion incident to the operation of a hand-wheel supported in horizontal bearings is wholly prevented.

The lower end of the sleeve 285 carries an intermediate bracket 15 supporting a stud 80 on which the intermediate bevel pinion 40 is mounted and on which it is held in place by a washer and screw 77. The intermediate bracket has a cap piece held in place by screws 109, Figs. 3 and 5, clamping the end of the sleeve. And said cap piece has a dowel 187 entering a hole in the sleeve by which the bracket 15 is held in proper location on the sleeve with the intermediate pinion 40 in mesh with the bevel pinion 268.

The dowel 187 being more or less slender provides an easily breakable and readily breakable part which will be sheared before any of the teeth of the gear train can become broken or stripped by reason of the great leverage of the hand wheel should anything clog the machine, as in an attempt to feed unduly thick or bulky matter or from other causes putting excessive burden on the teeth of the gear train. In case of the breakage of the dowel 187, and the continued rotation of the hand wheel, the construction is such that the bracket 15, will be rotatively forced around on its supporting sleeve 285, to thereby carry its bevel gear 40, out of mesh with the bevel gear 268, on the feed roller spindle 155, stopping all motion of the machine.

The hand wheel 139 is loosely mounted on its spindle and is held in place thereon by a cap 141 which has a diametrically disposed rectangular recess fitting a similar shaped end on the spindle and removably secured thereto by a screw 377. The hand wheel hub, however, carries a spring seated driving or clutch pawl 171 which engages with one of the side walls of the cap recess when the hand wheel is rotated forwardly and thereby communicates such motion of the hand wheel to the driving spindle 152. In a backward movement of the hand wheel its pawl will slip idly past the walls of the recess and consequently be ineffectual to move the rotative parts of the machine; the cap being in effect a ratchet wheel with two teeth.

The separator roller 44, Figs. 7 and 8, is carried at the end of a spindle 167 which is mounted in a bearing 27 projecting upwardly from one end of a horizontal rock arm 45 that is carried by a pivot 166 held in the table and gear plate. The separator spindle-bearing 27, Fig. 18, is arranged at some distance in advance of the pivot of the rock-arm 45, so that the feed roller when rotating will have the tendency of throwing the separator roller and the guard plate 58, away from said feed roller in contradistinction to the reverse and harmful tendency of drawing the separator roller and guard plate toward it were the pivot located forward of said bearing. In addition, the bearing supported by the forward free end of the rock-arm provides a long extended support for the roller spindle 167, so that the face of the separator rubber 247, will be worn straight in lieu of conical. To the lower end of the separator spindle 167 is secured a long gear toothed wheel 7 which is in constant mesh with the stud like teeth of a pinion 8 which is secured to the hub of one of the intermediates 16 of the gear train, the form of toothed wheel and pinion permitting a swinging movement of the separator bearing and arm due to the feed of varying thicknesses of mail matter and to the needed adjustments while keeping the wheel and pinion in mesh. The direction of rotation of the separator roller 44 is the reverse of the feeding movement of the feed roller or rollers and the gap between the oppositely revolving peripheries of the two rollers is so adjusted that the feed of more than one piece of mail matter at a time is prevented. This bearing 27 also carries the separator guard plate 58 by means of a pin 168 seated in a horizontal extension of the bearing with its screw threaded end engaged by a thumb nut 91 that is journaled in the bearing against endwise movement and when rotated adjusts the guard plate laterally with respect to its separator roller 44 and bearing 27, and also toward or from the opposed large feed roller 23. The guard plate is guided to move in right lines by its tongue 315 moving in a slot in an arm of the bearing. The thumb nut 91 is engaged by a spring seated ratchet pin 176 to hold it in against accidental rotations. The guard plate has high flat faces directly opposed to the large feed roller, is curved to guard the entrance to the separator roller and to form a curved wedge shaped throat for the leading edges of the assembled mail matter that is held upright with the forward or outer piece resting against the two feed rollers, but with very slight pressure against the smaller one.

The entrance end of the guard plate 58 is extended by a prolongation or loop 59 against which the pack of mail matter is alined. The inner end of the guard plate extends for a short distance alongside of and parallel with the path of movement of the mail matter from the feed and separator rollers to the trip feed and pressure rollers. This end of the guard is engaged by one end of an adjusting pin 93 pivoted thereto by a removable hinge pin 174. The outer end of the pin 93 passes through the eye of a post 12 projecting rigidly from the machine table 5 and is engaged by a thumb nut 85 which may adjust the separator as a whole, i. e. the roller and guard plate, toward or from the large feed roller. The adjusting pin has a coiled spring 221 interposed between the post and an adjustable collar 257 on the pin, which yieldingly holds the separator as a whole toward the feed roller and readily allows thick matter to pass without obstruction and against the pressure of which spring the separator may be bodily adjusted away from said feed roller.

The bodily adjustment of the separator is in the main to compensate for the wear of the rubber feed ring 245 of the large feed roller and adjustment of the guard with respect to the separator roller is to compensate for the wear of its rubber ring 247. The two adjustments also permit a regulation of the separator in dealing with quantities of mail matter either thinner or thicker than the average thickness of such matter so that the thinner matter will be properly separated and the feed of the thicker matter will not be unduly retarded.

The trip feed roller 146 is in two parts, separated sufficiently to accommodate a portion of the trip mechanism, the upper one being removably secured to a spindle 156 for access to and removal of the trip mechanism, and the lower part 147 fixed to said spindle. The spindle finds bearings in the table and gear plate and has secured to its lower end a gear 271 of the gear train. The coacting trip-pressure roller 149 is grooved to escape the protruding trip and is secured to a spindle 162ª mounted in bearings provided by a horizontal rock arm 28 having a pivot 104 seated in the table and gear plate; a suitable spring—see Fig. 18—connected to said arm and to a pin 20 depending from the table holding the pressure roller 149 yieldingly toward its companion feed roller 146—147, to permit varying thicknesses of mail matter to pass between them and be fed thereby.

The trip mechanism, Fig. 9 and 10, is supported by a trip-bar 67 removably mounted upon a pair of fixed posts 151 rising from the machine table and to which the bar is firmly clamped by a screw 82ª. The inner end of the trip-bar provides a bushed bearing for the upper end of the die spindle 157 and rigidly supports a trip guard 208 extending longitudinally along one side of the path of movement of the mail matter between the trip bar and the entrance to the trip feed and pressure rollers previously described. The outer end of the trip guard extends between the upper and lower trip feed-rollers and is bifurcated to provide room for the protrusion and free movement of the trip 205.

The trip or trip finger 205 is pivotally mounted to an arm of a rock lever 206 supported in bearings in the trip bar 67 and is also connected by a link 204 with one end of a rock arm 203 that is pivoted to the underside of the trip bar, which rock arm carries at its other end the rotatable star wheel stop 129 providing a plurality of seats for a coacting stop stud or roll 138 on the head of the printer or die-hub 207. The stop-carrying rock-arm 203 is held yieldingly by a coiled spring 192 against a fixed abutment pin 197 projecting from the underside of the trip bar; one end of said spring being connected to said rock arm 203 and the other to a longitudinally adjustable rod 110 secured in place in the trip bar by a set screw 108. The rock-lever 206 carries a second arm 24 arranged to rest normally against a stop shoulder 26 on the trip bar by the pull of a coiled spring 307, one end of which is connected to said arm and the other connected to the hooked end of an eye 331 fast to the trip bar. The construction of the trip is such that it has two independent movements from the normal position shown in Fig. 9. When the trip finger is struck by the leading edge of the mail matter in passing between the feed rollers 146, 147, 149 its free end is moved forward in the direction of travel of the matter and is rocked on its pivot in the arm of the rock-lever 206 thereby rocking the stop carrying arm 203 against the pressure of its spring 192 to move the stop 129 away from the die stop roll 138 to release the die. This rocking of the trip by the mail matter acts to free its end from said matter and allows it to return to its normal position under the pull of the spring 192. But the face of the mail matter then passing the end of the trip prevents its complete return or protrusion across the path of movement thereof so that the rock-lever 206 is compelled to rock or yield outwardly against the pull of its spring 307, which is considerably weaker than the spring 192, whereby the star wheel stop 129 is promptly returned to its die stopping position while the end of the trip is waiting for the passage of the rear end of the mail matter to be projected by the action of said spring 307 across its rear end and across the path of movement of the mail matter ready for the succeeding piece of matter. In the meanwhile the die 207 has rotated a single turn, impressed its mark or marks on the mail matter passing between it and the impression roller 34 and its further movement arrested by the meeting of its stop roll 138 with the star wheel stop 129.

The die hub 207, Figs. 11, 13 and 14, is fixed to a sleeve 134 mounted loosely on the spindle 157. The hub provides a flat seat for the die 133, a socket for a type seat 153 and where the machine is arranged to cancel postage stamps with supports for a plurality of usually parallel and partially encircling canceling bars 71. The head of the type seat 153 engages with the internal flange of the die 133 and its shank is engaged by a taper screw 184 which draws the die and type seat to the die hub 207. The head of the type seat 153 has a recess to receive one end of a type box 69, which lies flat against the face of the type seat. The type box has two sets of grooves or channels on its face to receive two lines of removable date type 68 and a suitably shaped spring 219 held in the recess in the die hub bears against one of the type to hold the type box removably in place. By pressing upwardly on the end of the spring with a proper tool the type box with its type may be simultaneously removed from the type seat. The lower end of the die hub sleeve 134 enters the clutch cup 143 which forms a part of the die spindle 157 and in which the clutch disks 135 are seated. The lower end of the die hub sleeve rests in the clutch cup against a pair of bottom washers 238, one of vulcanized fiber and the other of steel, and the opposite sides of the sleeve have vertical ribs or spines which take into inner grooves in the alternate clutch disks 237 preferably of vulcanized fiber and which are loose with respect to the clutch cup. The other interposed clutch disks 135 of steel are loose with respect to the die hub, but have outside grooves embracing the sides of a pair of clutch dogs or keys 130 the upper end of which project over the upper clutch disk and tend to draw all the clutch disks in frictional surface contact with each other and the lower one against the bottom of the clutch cup. The clutch dogs 130 are connected and moved together by a cross bar 172 passing through a slot through the hub of the clutch cup and the spindle 157; and the desired downward pressure of the dogs upon the clutch disks is had by a spring 226 located within a central hole in the spindle and mounted between a pressure adjusting top screw 251 having a jam nut 114 and a loose rod 334, the lower end of which bears against said cross bar of the clutch dogs. The dogs are held in place laterally by a clutch cover 145 which also protects the clutch from dirt and confines the necessary lubricant for the disks to the clutch cup.

It will be understood that while the spindle 157 is rotating and the die hub and sleeve is at rest being held by the stop 129 the alternate clutch disks 135 rotate with the spindle and clutch cup and slip idly around with respect to the other clutch disks 237 that are at rest with the die hub-sleeve. The surface frictional contact between the disks, however, is sufficiently great that immediately the stop 129 is removed from the die hub roll 138, the die hub sleeve is caused to partake of the rotation of the spindle until again brought to rest by the interposition of the stop 129. The lower end of the die spindle has secured to it a gear 277 of the train.

The impression roller 34 is secured to a spindle 162 mounted in bearings provided by a horizontal rock arm 33 that is carried by a pivot 166$^a$ seated in the machine table 5 and gear plate 6. The lower end of the spindle 162 carries one of the gear train in mesh with an intermediate 273 rotating on a stud projecting from the rock arm 33 which in turn is in mesh with the gear train through a gear 279 loosely mounted on the rock arm pivot 166. The impression roller is held to duty by the pull of a coiled spring 215, one end connected by a screw rod and a pressure regulating nut 119 to the rock arm 33, and the other to a stud projecting from the machine table. The inward position of the impression roller with respect to the printing die is adjusted by a stop screw 348 carried by the rock arm 33 and bearing against an abutment, on the machine table, see Figs. 11 and 18. The adjusting stop screw may be held against accidental movement by a plug pressed against the threaded portion of said screw by an angularly disposed set screw 251.

The stacker feed roller 144 is secured to a spindle 38 mounted in bearings in the machine table and gear plate and is properly rotated by a gear 278 of the gear train secured to its lower end. The coacting idler roll 351 is mounted to turn on a pin carried by a guard plate 55 that is secured to a pivot spindle 105 adapted to turn in bearings in the machine table and gear plate with its lower end supported by a thrust plate 327, see Fig. 12. The pivot spindle 105 carries an arm 43 having a roll 317 which occupying a position at one side of the axis of the pivot is borne upon by one end of a suitable spring 216 by which the idler and guard plate are yieldingly held in active position as indicated in Figs. 1, 2, 12 and 18, and at the same time allows the idler and guard to be swung on its pivot to one side, see dotted lines in Fig. 2, with its arm 43 against a stop, to permit access to the printing die; the spring 216 constantly acting against the arm 43 while being moved and also after it occupies a position on the other side of the axis of the pivot serves to also hold the idler and guard in their moved position. The spring 216 is supported in position by a screw 48 threaded into the machine table 5, with its end projecting a short distance above its upper surface for a purpose to be explained, and the free end of the spring bears against a shoulder projecting from the under side of said table.

The stacker star wheel 9 is secured to a spindle 158 mounted in bearings in the machine table and gear plate and has a gear secured to its lower end forming one of the gear train.

The stacker guard 57 is secured to the top of the machine table and extends longitudinally along one side of the path of movement of the mail matter from the printing couple to the further end of the machine table. The guard has a bearing for a sliding rod 49 which through a bracket 51 carries the end stop 50. The position of the end stop may be adjusted with respect to the rotating star wheel to accommodate short or long mail matter by moving the slide rod 49 in its bearing and clamping it in position by a thumb nut 259, see Figs. 2 and 3. The stacker slide plate 54 is fixed to the upright portion of a slide bar 66 which rests in a transverse groove or depression in the machine table so not to obstruct the level surface of said table. The slide plate 54 is fitted with runner blocks 224 of fiber or leather that are arranged to run on planed or polished surfaces or ribs on the machine table thereby rendering the slide plate very free of movement. The slide plate instead of being parallel with the guard plate 57 is preferably angularly disposed with relation thereto so that mail matter occupying the stacker will rest at an angle to said guard plate and present a wider and unobstructed entrance for the incoming mail matter.

The printing die will be suitably inked at each rotation by an inked felt roller 242 mounted to turn on a stud pin 198 carried by one end of a bar 36. This bar is slotted to pass the end of a screw rising from the machine table and is confined in place by a thumb nut 260 engaging said screw. The inner end of the felt roller bar 36 is held in proper radial position with respect to the printing die by a pair of pins projecting from the machine table one of which is formed by the end of the screw 48 that supports the stacker idler spring 216 before referred to.

Instead of relying upon the surface of the machine table 5, over which the mail matter moves on its longitudinal narrow edge, which table being cast may be more or less uneven, it is preferred to continue the level polished surface of the table plate 297 located at the feeding position throughout the path of movement of the mail matter through the machine with a letter track plate 65 secured by screws to the machine table and cut away at points to permit the several rollers to properly approach one another. The slots in the machine table 5 through which the bearings of the yieldingly mounted rollers pass, such as the separator roller bearing 27, the rock arm bearing 28 for the trip pressure roller and the rock arm bearing 33 for the impression rollers are each protected by dust guards 47 carried by and movable with said bearings with their inner ends playing in slots in the under side of the letter track 65, and are guarded thereby, see Figs. 7 and 11. To guard and direct the mail matter from the large feed roller 23 to the trip feed and pressure rollers there is provided a longitudinally arranged guide conveniently held at one end by the bushing of the small feed roller bearing and at the other end by a pin projecting from the guide into a hole in the table, see Figs. 2, 3 and 7.

The machine, Fig. 19, may be supported by a wooden rectangular base 254 the four sides of which are deep enough to accommodate the gearing below the machine table 5 the latter forming a cover for the base. To permit access to the gearing the machine may be swung upwardly as shown in the figure, the table being provided on one side with depending posts 53 adapted to rest on top of one of the sides of the base and having projecting pins 72 to prevent the posts slipping off the base. The machine is held in this turned up position by a brace rod 30 the opposite bent ends of which are caused to enter one end in a hole in the wooden base and the other end in a hole in a post 52 fixed to the machine table, and the machine is otherwise prevented from falling by a chain 248 fastened to the base and to the machine table. The wooden base 254 may be supported by a spider or bracket 3 adjustably mounted in the upper end of a column stand 2, or may be placed directly on a working bench or table.

What is claimed is:

1. A mail marking machine comprising a machine table, feeding and marking instrumentalities mounted to rotate in vertical bearings formed in said table, and a driving spindle therefor mounted in an inclined bearing formed in said table, said spindle having at one end, below the table, bevel gearing for transmitting motion to said instrumentalities and at its other end a handwheel partially overlying the table and in propinquity to the feeding instrumentalities.

2. A mail marking machine comprising a machine table, a feed roller the spindle of which is mounted to rotate in vertical bearings in said table and a driving spindle therefor mounted in an inclined bearing formed in the table, said driving spindle having at one end below the table bevel gearing connected to the feed roller spindle and at its other end a hand wheel partially overlying the table and in propinquity to the feed roller.

3. The combination with the feeding and marking instrumentalities, of an inclined driving spindle therefor carrying one of a train of bevel gears, a bracket frictionally mounted concentric with the longitudinal axis of the spindle and supporting another of said train of gears, whereby on excessive strain to the gearing sufficient to overcome the frictional mounting of the bracket, the bracket will rotatively turn with respect to the driving spindle and thereby move its gear from mesh with another gear of the train.

4. The combination with the feeding and marking instrumentalities, of an inclined driving spindle therefor carrying one of a train of bevel gears, a sleeve forming a bearing for said spindle, and a bracket mounted on and clamped to said sleeve and carrying another of said train of bevel gears, whereby on excessive strain to the gearing sufficient to overcome the friction of the clamp the bracket will rotatively turn on the sleeve and thereby disconnect a portion of said gearing.

5. The combination with the feeding and marking instrumentalities, of an inclined driving spindle therefor carrying one of a train of gears, a bracket mounted concentric with the longitudinal axis of said spindle and having a support for one of said train of gears and a shearable pin holding the bracket in position whereby on excessive strain to the gearing the bracket will rotatively turn on the sleeve and disconnect the gearing.

6. The combination with a feed roller, its spindle and gear secured thereto, of a driving spindle therefor having a gear secured thereto, a fixed sleeve supporting said spindle, a bracket frictionally clamped to said sleeve and carrying a stud and a gear mounted on said stud intermediate between said other two gears, whereby on excessive strain to the gearing sufficient to overcome the friction of the clamp the bracket will rotatively turn on the sleeve and thereby disconnect a portion of the gearing.

7. The combination with a feed roller, its spindle and bevel gear secured thereto, of a driving spindle therefor having a bevel gear secured thereto, a fixed sleeve supporting said spindle and mounted in an inclined bearing, a bracket frictionally clamped to said sleeve and carrying a stud and a bevel gear mounted on said stud intermediate between said other two bevel gears, whereby on excessive strain to the gearing sufficient to overcome the friction of the clamp the bracket will rotatively turn on the sleeve and thereby disconnect a portion of the gearing.

8. The combination with a feed roller, its spindle and gear secured thereto, of a driving spindle therefor having a gear secured thereto, a sleeve on said spindle fixed with respect thereto, a bracket supported on said sleeve and carrying a stud, a gear mounted on said stud intermediate between said other two gears and a shearable pin connecting the sleeves and bracket together whereby on excessive strain to the gearing the bracket will rotatively turn on the sleeve and disconnect the gearing.

9. The combination of the rotatable printing die, an impression roller therefor, a yieldingly mounted rock-arm supporting the roller, a gear secured to the roller, a gear mounted concentric with the pivot of the rock-arm and another gear intermediate of said two gears and supported by said rock-arm.

10. The combination of the rotatable printing die, an impression roller therefor, a rock-arm supporting the roller, a gear secured to the roller, a gear mounted concentric with the pivot of the rock-arm, another gear intermediate of said two gears and supported by said rock-arm, an adjustably connected spring for the rock-arm and an adjustable stop-screw carried by and limiting the inner position of the rock-arm.

11. The combination of the positively driven stacker feed roller, the pivotally mounted idler roller coacting therewith and a spring adapted to hold said idler roller both toward and away from the feed roller.

12. The combination of the positively rotated stacker feed roller, an idler roller coacting therewith, a pivot supporting said idler roller, an arm secured to the pivot and a spring coacting with the arm to hold the idler roller both toward and away from the feed roller.

13. The combination of the stacker feed roller, an idler roller coacting therewith, a pivoted guard plate supporting said idler roller and a spring acting on said guard plate to hold the idler roller toward the feed roller.

14. The combination with the feed and marking instrumentalities, of a driving spindle geared to rotate the same, a hand wheel loosely mounted on said spindle, a yielding clutch member carried by said hand wheel and a cap piece confining the hand wheel in place and forming the coacting clutch member secured to the spindle.

15. In a machine of the class described the combination of a rotating spindle, a die hub loosely mounted thereon and seated against bottom disks, a plurality of clutch disks encircling the die hub and connected alternatively to the spindle and die hub and a removable stop engaging the die hub.

16. The combination of a rotating spindle, clutch disks connected to rotate therewith, a die hub loosely mounted on said spindle and seated against bottom disks, other clutch disks connected to the die hub and alternating with those of the spindle, and a removable stop engaging said die hub.

17. The machine table carrying the operating mechanism and capable of being tilted with respect to its support, posts projecting from the table to provide rests for the table when tilted, and a table brace post also projecting from the table.

18. The machine table carrying the operating mechanism, a hollow base carrying the machine table and with respect to which the table may be tilted, posts projecting from the table to form rests therefor when tilted, a table brace post also projecting from the table, and said hollow base provided with the other member of the table brace.

In testimony whereof, I have signed my name to this specification in the presence of two subscribing witnesses, this 14th day of February 1905.

FREDERICK G. JAHN.

Witnesses:
GEO. H. GRAHAM,
A. T. DOLPHIN.